P. WILLMANN.
SPRING CONTROLLED MECHANISM.
APPLICATION FILED AUG. 29, 1912.
1,068,290.
Patented July 22, 1913.
2 SHEETS—SHEET 1.
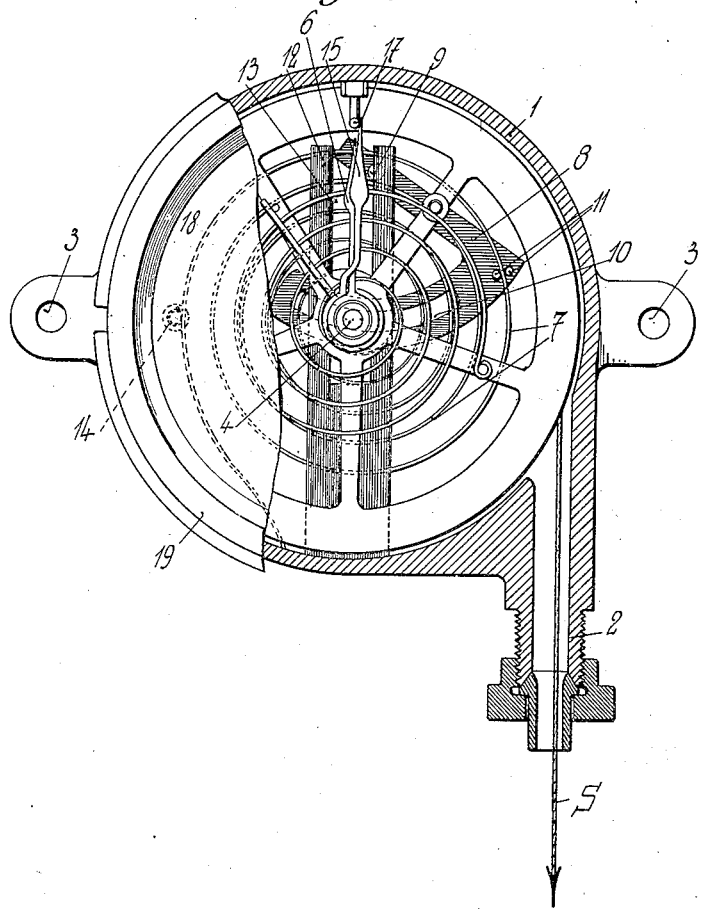
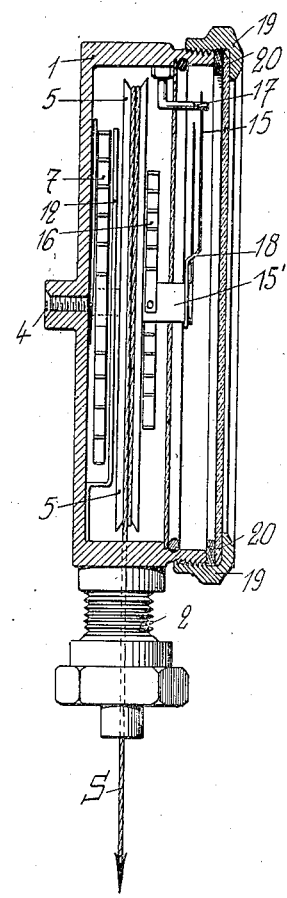
Witnesses
A. Van Loock
Inventor
Paul Willmann
Attorneys

P. WILLMANN.
SPRING CONTROLLED MECHANISM.
APPLICATION FILED AUG. 29, 1912.

1,068,290.

Patented July 22, 1913.
2 SHEETS—SHEET 2.

Witnesses
A. Van Loock
S. M. McColl

Inventor
Paul Willman

By D. H. Wilson & Co.
Attorneys

UNITED STATES PATENT OFFICE.

PAUL WILLMANN, OF BERLIN, GERMANY.

SPRING-CONTROLLED MECHANISM.

1,068,290.  Specification of Letters Patent.  Patented July 22, 1913.

Application filed August 29, 1912. Serial No. 717,783.

*To all whom it may concern:*

Be it known that I, PAUL WILLMANN, a citizen of the German Empire, and residing at Berlin, Germany, have invented certain new and useful Improvements in Spring-Controlled Mechanisms, of which the following is a specification.

My invention relates to a regulating device for spring-controlled mechanism which prevents sudden changes in tension when contracting and releasing the spring, such as are produced by the turns of the spring jumping out of the plane of the spring and by the individual turns being contracted at various speeds. The regulating device comprises a fixed and a movable guide for the spring, and a corresponding, rotatable bearing of the outer end of the spring.

The regulating device is of special importance for clock-like apparatus having pointer mechanism for indicating the results of continuous measurements, in which therefore the pointer connected with the spring-controlled mechanism must constantly rotate exactly according to the continuous measurement. Such apparatus include, for example, clock-like indicating devices for instruments for measuring lengths, depths and the like. The invention is hereinafter explained with reference to such an instrument. Owing to the regulating device which assures the spring being constantly tensioned evenly it is possible to obtain an exact indication of the measurements even when the pointer rotates several times. The dial of the indicating device described hereinafter is therefore provided with several circular scales of various colors, and instead of one pointer I provide several pointers of various lengths, namely a separate pointer for each scale, which pointers indicate in succession the result of the continuous measurement. This is effected either by the pointer which rotates for the time being driving the following pointer after one revolution, or by one of the pointers being stopped in succession after each revolution. Owing to the peculiar nature of the pointers they may be designated drag-pointers.

One illustrative embodiment of my invention is represented by way of example in the accompanying drawing, wherein:—

Figure 3:
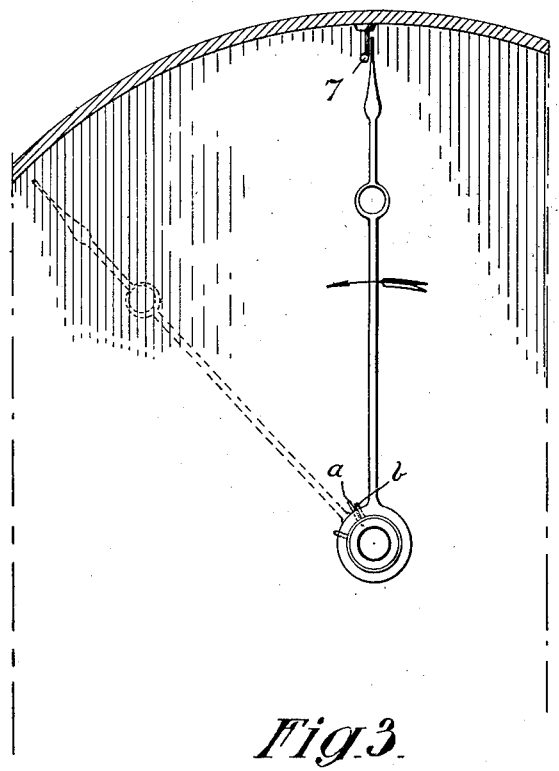
Figure 4:
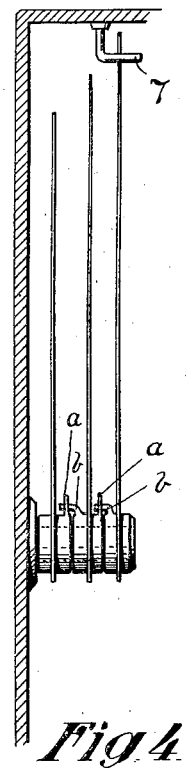

Figure 1 is a front elevation of an indicating device and its regulating device for the spring, the cover having been partly removed and the dial not being shown, and Fig. 2 is a vertical section through the device. Fig. 3 is a sectional view showing the pointer in front elevation; Fig. 4 is a sectional view taken in a plane at right angles to Fig. 3 and with the pointer shown in side elevation.

Referring to the drawing, the indicating device is mounted in a casing 1 which has a tubular inlet 2 for guiding the cord for transmitting the measurement, and attachment lugs 3, 3. Journaled in the center of the rear wall of the casing is a pivot 4, on which is mounted a grooved pulley 5, over which runs the cord S moved by the measuring mechanism, not shown, according to the continuous measurement. Rigidly connected with the wheel 5 is a pointer 6 which indicates the movement of the wheel on a dial not shown. The movement of the grooved wheel and pointer 6 is regulated by a spiral spring 7 mounted free to move between the grooved wheel and the rear wall of the casing, the inner end of this spring being attached to the grooved wheel, and the outer end in suitable manner to the rear wall of the casing. This spring 7 is the main spring of the indicating device. The regulating device according to my invention is arranged at this spring. It comprises a flat sector 8 mounted to rock about a pivot 9 fixed on the rear wall of the casing. The sector has a slot 10, by which it is guided by the pivot 4, and at its outer end a guide 11, in the form of two pins, an eyelet or the like, through which one turn of the spring 7 runs. This sector 8 constitutes the movable guide of the spring.

In order to prevent the free turns of the spring jumping out of the plane of the spring I mount on the rear wall of the casing a forked cover 12 which extends between spring 7 and the wheel 5, the pivot 4 passing through the space 13 between its prongs. Lastly, in order that the outer last turn of the spring 7 can adapt itself to the change of position when the spring contracts and opens out, its end is clamped in a bearing 14 rotatable on the rear wall of the casing.

As the measurement continues the grooved wheel 5 rotates two or more revolutions. Accordingly I provide the dial with several circular scales, on which the measurement is indicated in succession by one, two, three and more pointers in addition to the pointer 6. The rings of the scale are shown in various colors, to which the color of the corresponding pointers corresponds. In the illustrative embodiment the dial is supposed to have two circular scales, and the provision of a second pointer 15 corresponds thereto. This pointer is free to rotate about the pivot 4 and in its zero position registers with the pointer 6. The axle-bush 15' of the pointer 15 is connected with the inner end of an auxiliary spring 16 whose outer end is attached to the wheel 5. The pointer 15 bears against a stop 17 of the casing in its zero position and in this position holds the pointer 6 fast against the action of the spring 7 by means of a bend 18.

The entire indicating device is covered with a glass cover comprising a ring 19 screwed to the casing. Packing 20 forms an air-tight and dust-tight joint between the ring and the casing.

The indicating device could also be constructed by attaching the inner end of the auxiliary spring 16 for the second pointer 15 to the pointer, and its outer end to the casing. When the grooved wheel 5 begins to rotate the pointer 15 will then at first remain stationary. On the pointer 6, which is located a little in front of the pointer 15 in the clockwise direction in the zero position, is a pin which after one revolution of the pointer 6 coacts with the pointer 15 and drives the same, when the pointer 15 registers with the pointer 6. Three or more pointers can be combined in like manner in the two constructions.

Each pointer actually makes but one sole revolution, but the pointers are all moving separately. The second one starts only when the first one has made one revolution, and the third one only after the second one has performed one revolution and so on. The scale is arranged in rings, so that each pointer is making its indication on one of these scales. The indication device as shown in the drawing, can, of course, only work with two pointers, 6 and 15. The pointer 6 is in fixed connection with the grooved wheel 5. The pointer is free to rotate about the pivot 4. The axle bush 15' of the pointer 15 is connected with the inner end of an auxiliary spring 16, whose outer end is attached to the wheel 5. The pointer 15 bears against a stop 17 of the casing and the spring 16 pushes the pointer 15 always to the left, seen from the spectator. The stop 17 limits this rotation and on the other side, the pointer 15 stops the pointer 6, around which it grips with the broken part at its inner end. When the grooved wheel 5 is turned, the pointer 6 moves first, while the pointer 15, which is loosely mounted on the pivot 4 of the wheel 5, is retained through the spring 16. It is only after the pointer 6 has made a rotation that it comes into gearing with the pointer 15 at the rear bent part of the same, thus carrying it away. Then pointer 15 can perform a rotation, namely, up to stop 17. When returning, the pointer 15 moves backwardly until the stop 7 stops it, whereas pointer 6 makes two rotations until it is stopped by pointer 15.

Figs. 3 and 4 of the drawing show three pointers, the lower one of which is fixed to the wheel 5, the two others being loosely mounted on the axle 4. The upper pointer bears against the stop 7 and is connected to the casing by spring 16. The spring 16 draws the upper pointer to the left hand side in the direction of the arrow and when the wheel 5 is turned, it carries the lowest pointer with it. At the axle bush of the same is provided a projecting pivot $a$, which is placed to the right of a downwardly projecting pivot $b$ at the axle bush of the medium pointer. After one rotation the pivot $a$ of the lowest pointer (see Fig. 4) gears with the pivot $b$ and carries the second pointer away. On this second and on the third pointer are pivots $a$ and $b$, which after a rotation of the medium pointer, and after the lower one has already made two rotations, carry off the uppermost pointer. The uppermost pointer makes now also a rotation, and the same might be the case with a fourth pointer, should such be employed. If the wheel 5 is released, the spring 16 will at once turn the uppermost pointer backward. It is, however, at this moment coupled with both of the other pointers, and therefore carries both of them off. After one rotation the uppermost pointer stops, and hereafter the second, or the lowermost, turns onwardly, and its pivot $a$ again couples after one rotation with the pivot $b$ of the second pointer on the other side, in such manner, that the second pointer is also carried off once for a rotation. If the lowermost pointer has made three rotations, then all three pointers have reassumed their original and normal position. Thus it is proved, that the lowermost pointer, makes three rotations forward and backward, the second makes two rotations and the third pointer makes one, and that the pointers are carrying one another off by guided movement.

When the indicating device is operated by the measuring mechanism by rotating the wheel 5 through the medium of the cord S, the regulating device of the spring acts in such manner that the sector 8, which is driven by the spring 7 when the latter is tensioned, regulates the radial distance apart of the contracting turns of the spring. The fork 12 prevents the turns of the free spring jumping out of place, and the bearing 14 of the outer end of the spring rotates corresponding to the change of position of the spring, so that no bending strains can occur.

During the first revolution of the grooved wheel the pointers 6 and 15 move conjointly in the illustrative embodiment, the pointer 6 being driven by the wheel itself and the pointer 15 by the tension of the spring 16. After one revolution the pointer 15, which indicates the first result of the measurement on the outer circular scale, stops by engaging with the stop 17. The pointer 6 moves further alone and indicates the further additional results of the measurement on the inner ring of the scale.

In the second arrangement of the pointers described above the pointer 15 remains stationary at first. Only the pointer 6 rotates, until after one revolution the above-mentioned pin coacts with the pointer 15 in such manner that the latter is driven and, registering with the pointer 6, indicates the measurement.

The pointers are returned into the zero position in both constructions under the action of the springs 7 and 16 in a manner which will be readily understood.

I claim:—

1. In spring-controlled mechanism, the combination with a spiral spring, of a fixed guide parallel to the plane of the spring, a movable guide for guiding the outer portion of the spring, and a fixedly mounted, rotatable bearing attached to the outer end of the spring.

2. In spring-controlled indicating mechanism, the combination with a casing, an axle journaled therein, and a spiral spring having its inner end attached to the axle, of a forked guide fixed on the casing parallel to the plane of the spring at one side thereof and embracing the axle with clearance, a sector-shaped member mounted to rock in the casing and guided by the axle at the other side of the spring, said member having a guide for guiding the outside turn of the spring, and a rotatable bearing fixedly mounted in the casing and attached to the outer end of the spring.

3. In indicating mechanism of the character described, the combination with a casing, an axle journaled therein, a wheel fast on the axle, a spiral spring having one end attached to the casing and the other end attached to the axle, and a pointer fast on the axle, of a drag-pointer free to rotate about the axle, a second spiral spring having one end attached to the drag-pointer and its other end attached to the wheel, and a stop fixed on the casing for arresting the drag-pointer.

4. In indicating mechanism of the character described, the combination with a casing, an axle journaled therein, a wheel fast on the axle, a spiral spring having one end attached to the casing and the other end attached to the axle, and a pointer fast on the axle, of a drag-pointer free to rotate about the axle, a second spiral spring having one end attached to the drag-pointer and its other end attached to the casing, and a pin on the former pointer for coacting with and driving the drag-pointer.

In testimony whereof, I affix my signature in the presence of two witnesses.

PAUL WILLMANN.

Witnesses:
  HENRY HASPER,
  ARTHUR SCHROEDER.